United States Patent [19]

Dosaj et al.

[11] Patent Number: 4,702,902
[45] Date of Patent: Oct. 27, 1987

[54] HANDLING OF BY-PRODUCT GASES FROM A SILICON FURNACE

[75] Inventors: Vishu D. Dosaj; John D. Oleson, both of Midland, Mich.; Gary N. Bokerman, Madison, Ind.

[73] Assignee: Dow Corning Corporation, Midland, Mich.

[21] Appl. No.: 30,654

[22] Filed: Mar. 25, 1987

Related U.S. Application Data

[63] Continuation-in-part of Ser. No. 856,996, Apr. 29, 1986, abandoned.

[51] Int. Cl.$^4$ ............................................. C01B 33/02
[52] U.S. Cl. ........................................ 423/350; 55/68; 55/82; 75/10.12; 75/10.36; 204/164; 266/146
[58] Field of Search .................. 204/164; 423/350; 55/68, 82; 75/10.12, 10.36; 266/146

[56] References Cited

U.S. PATENT DOCUMENTS

| | | | |
|---|---|---|---|
| 3,660,298 | 5/1972 | McClincy et al. | 423/350 |
| 4,450,003 | 5/1984 | Herold et al. | 75/10.12 |
| 4,457,902 | 7/1984 | Watson | 423/350 |

OTHER PUBLICATIONS

Nagamori et al., Met. Trans, 1986, vol. 17B, p. 503.
Ramsdstad et al., Met. Soc. AIME (1961), vol. 22, p. 1021.
JANAF Thermochemical Tables, Dow Chemical Co., Midland, Mich. 1986.
Kubaschewski et al., Metallurgical Thermo Chemistry, 5th Ed., Pergamon Press, N.Y., N.Y.
Gel'd et al., The Priklady Khim, 1948, vol. 21, p. 1249.

*Primary Examiner*—Arthur P. Demers
*Attorney, Agent, or Firm*—Carl A. Yorimoto

[57] ABSTRACT

What is disclosed is an improvement in a process for the carbothermic reduction of silicon dioxide to form silicon, the improvement comprising (a) contacting the by-produced gases from the silicon furnace with a cooling medium such as a vaporizing liquified hydrocarbon-containing gas or an expanding compressed hydrocarbon-containing gas to cool the by-produced gases and to cause silicon-containing materials to completely condense and to form agglomerated solids; (b) removing the agglomerated, solid materials from the gases, and (c) recovering value from the solids-free by-produced gases as an energy source or as a chemical intermediate.

19 Claims, 1 Drawing Figure

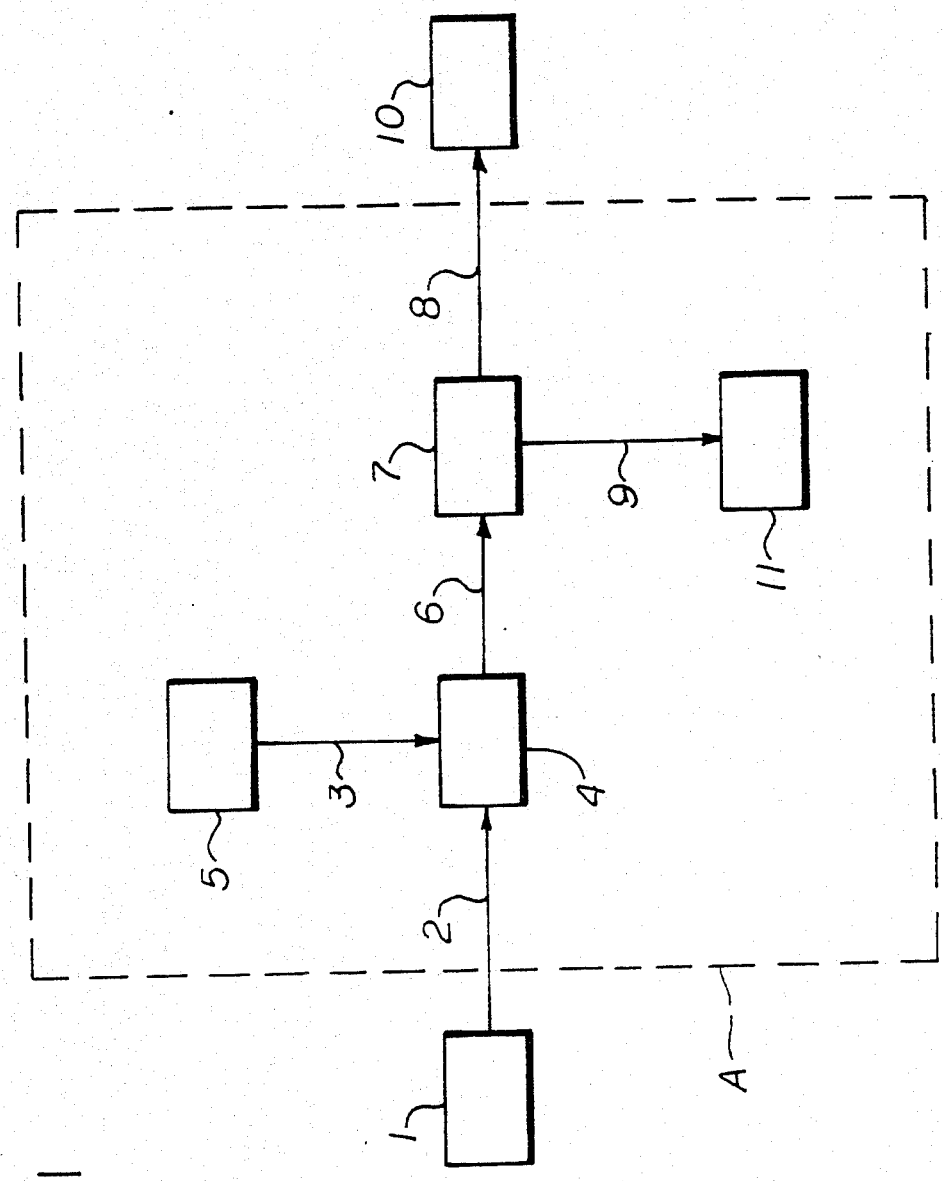

HANDLING OF BY-PRODUCT GASES FROM A SILICON FURNACE

This application is a continuation-in-part of application Ser. No. 856,996 filed Apr. 29, 1986, now abandoned.

BACKGROUND OF THE INVENTION

This invention relates to an improvement in the process for the carbothermic reduction of silicon dioxide to prepare silicon in which the by-produced gases of the process are freed of silicon monoxide and other silicon-containing materials to facilitate recovery of the chemical intermediate and energy value of the combustible by-produced gases.

Silicon is prepared by the carbothermic reduction of silicon dioxide ($SiO_2$) and carbonaceous reducing agents. The overall reduction reaction can be represented by the equation $$SiO_2 + 2C = Si + 2CO$$

It is generally recognized that the above reaction in reality involves multiple reactions, the most significant being outlined below:

$$SiO_2 + 3C = SiC + 2CO \quad (1),$$

$$SiO_2 + C = SiO + CO \quad (2),$$

$$SiO + 2C = SiC + CO \quad (3),$$

$$2SiO_2 + SiC = 3SiO + CO \quad (4), \text{ and}$$

$$SiO + SiC = 2Si + CO \quad (5).$$

The primary gaseous by-product is carbon monoxide (CO). However, since the carbonaceous reducing agent can come from a wide range of materials including wood and other hydrocarbon containing materials, the by-produced gases may also contain other combustible constituents such as hydrogen, methane and other hydrocarbons.

Present commercial silicon furnaces are estimated to consume approximately three times the theoretical amount of energy needed to effect the reactions, supra. Approximately 50 percent or more of the energy input to the reduction process can be accounted for in the carbon content of the carbonaceous reducing agents. This energy is presently lost as gaseous by-products, mainly CO. As an example of the energy balance around a silicon furnace, the possible distribution of the energy that is supplied to a silicon furnace with a 20 megawatt (MW) electrical energy source as compared to the energy consumed or leaving the silicon furnace is as follows:

|  | % Total Energy | Energy MW |
|---|---|---|
| Input | | |
| Electrical energy | 47 | 20 |
| Energy value of reducing materials | 53 | 22.5 |
| Total | 100 | 42.5 |
| Output | | |
| Energy to effect reduction | 30 | 12.5 |
| Sensible heat in molten metal | 4 | 1.8 |
| Heat lost to cooling water | 10 | 4.4 |
| Energy value of furnace gases | 56 | 23.8 |
| Total | 100 | 42.5 |

Most silicon furnaces operate in an "open" mode in which the furnace is not sealed and air is allowed to dilute the by-produced gases. Typically, the gases finally discharged from the furnace system may be as little as 3 volume percent of the by-produced gases, the remainder being air. Recent developments in silicon furnace technology facilitate the effective sealing of the furnace to operate in a "closed" mode. Effectively sealing the furnace will allow collection of by-produced gases in an undiluted form.

From the reactions described, supra, one of the intermediates in the reduction process is silicon monoxide (SiO). At the temperatures of the reaction SiO is a gas. As the temperature of the by-produced gases leaving the silicon furnace cool to approximately 1500° C. or lower, the SiO is thought to disproportionate to a mixture of silicon and $SiO_2$. The disproportionation of SiO can be represented by the reaction $$2SiO = Si + SiO_2.$$

The silicon and $SiO_2$ so formed would be a finely dispersed solid in the by-produced gas stream. It is estimated that as much as 10 to 20 percent of the silicon in the $SiO_2$ fed in present silicon furnaces is lost as gaseous SiO or as silicon and $SiO_2$ from the disproportionation of SiO. SiO will also react with oxygen to form solid $SiO_2$. The presence of SiO, silicon, or $SiO_2$ causes mechanical difficulties in schemes to recover chemical and energy value. As an example of these difficulties, the possible use of the by-produced gases to operate a steam boiler could be a problem. Combustion of the by-produced gases in a steam boiler converts any silicon-containing material to $SiO_2$. It is known in the art that at combustion temperatures $SiO_2$ can fuse into a glassy material and cause fouling of the boiler tubes. Another example of potential mechanical problems is in combustion of the by-produced gases in a gas turbine, where any solid $SiO_2$ formed could cause severe erosion of the high-speed, rotating turbine. Pre-cooling of the by-produced gases by conventional heat exchanger means to agglomerate the finely dispersed silicon and $SiO_2$ and subsequent solid removal from this gas stream would appear to be one solution to this problem. However, the process of cooling the gases could be severely hindered by the formation of agglomerated solids on heat transfer surfaces.

The primary objective of the instant invention is to effectively remove silicon-containing materials from the by-produced gases from a silicon furnace to facilitate practical recovery of the chemical intermediate or energy value of these gases while avoiding the above-mentioned problems. A further objective is to lower the manufacturing cost of silicon by recovery of the potential energy in the by-produced gases.

Herold et al. in U.S. Pat. No. 4,450,003, issued May 22, 1984, disclose a process for the recovery of combustible gases from electrometallurgical furnaces. The electrometallurgical processes cited included silicon manufacture. Herold et al. goes on to disclose that these gases can be used by any known process, such as providing a boiler gas to generate steam and supplying a gas turbine which is coupled to an electric generator. However, nowhere does Herold et al. disclose, via discussion or example, the presence of silicon monoxide or other silicon-containing materials in the combustible gases from a silicon furnace. Nowhere does Herold et al. disclose the potential problems associated with the presence of silicon monoxide or other silicon-containing materials in the by-produced gases or any means to handle the problem.

The instant invention utilizes the cooling effect of a vaporizing liquid or an expanding compressed gas without introducing a diluent material to the by-produced gases that would be detrimental to recovery of the by-produced gases as a combustible fuel or as a chemical intermediate. The instant invention also utilizes the nature of finely dispersed silicon-containing materials to completely condense and to agglomerate to larger solid particles upon cooling. The combination of the these two features will generate a solid-containing gas stream that can be handled by solid-gas separation techniques to yield a gas with a high potential for practical chemical and energy recovery.

DESCRIPTION OF THE DRAWING

The instant invention will become better understood by those skilled in the art from a consideration of the attached drawing. FIG. 1 is a schematic representation of one possible embodiment of the instant invention. FIG. 1 is a schematic diagram outlining (a) the contacting of the by-produced gases with a liquified hydrocarbon-containing gas; (b) the removing of solid silicon-containing materials from the total gas stream; and (c) the passing of the solid-free gas to energy recovery.

In FIG. 1, 1 is a representation of a silicon furnace. The silicon furnace is a closed furnace capable of being operated under pressure. The silicon furnace can be of designs and installations known in the art such as a submerged electric arc furnace or a furnace in which the electrical energy is provided by a transferred arc plasma. The hot by-produced gas stream 2, containing gaseous silicon dioxide or finely dispersed silicon and silicon dioxide, leaves the silicon furnace at a temperature of 600° C. or higher. The silicon furnace is typically operated at or above atmospheric pressure. Typically there is a sufficient driving force of pressure within the furnace to facilitate transmission of the gas stream 2 for subsequent handling. A liquified hydrocarbon-containing gas stream 3 is fed, along with the by-produced gas stream 2 to a means 4 for contacting the by-produced gas stream 2 and the liquified hydrocarbon-containing gas stream 3. In the means 4 the liquified hydrocarbon-containing gas stream 3 vaporizes, cooling the hot by-produced gas stream 2 and causing silicon-containing materials to completely condense to a solid and to agglomerate. The means 4 for contacting streams 2 and 3 can be any known means in the art for facilitating the vaporization of a liquified gas, such as an expansion chamber. The liquified hydrocarbon-containing stream 3 is fed to means 4 for contacting streams 2 and 3 by a means 5 for feeding a liquified gas. The means 5 for feeding a liquified gas may be any conventional means such as use of the pressure in the vapor space of a liquified gas storage tank as the motive force or use of a pump suitable for handling liquified gases. The cooled stream 6, comprising the by-produced gases and solid, agglomerated silicon-containing materials, is passed through a means 7 for separating the by-produced gases from the solid, agglomerated silicon-containing materials. The means 7 for separating solid, agglomerated silicon-containing materials from the cooled stream 6 can be any conventional means of solid-gas separation such as a fabric filter bag in a baghouse. The means 7 for separating solids and gases separates cooled stream 6 into a solids-free by-produced gas stream 8 and a stream 9 of solid, agglomerated silicon-containing materials. The solids-free by-produced gas stream 8 is passed on to a means 10 for recovering the energy value of the by-product gas stream 8. This means 10 of energy recovery can be any conventional means such as combustion in a steam boiler or combustion in a gas turbine. The solid, agglomerated silicon-containing materials stream 9 is handled by a means 11 for disposing of the finely divided powder. The means 11 of disposal of the solids stream 9 can be such conventional means as dust collection and disposal or recycle of the silicon-containing material to the silicon furnace as a feed.

DESCRIPTION OF THE INVENTION

In accordance with the instant invention there is provided an improvement to a process for the preparation of silicon under conditions which will be delineated herein. What is described, therefore, is an improvement in a process for the carbothermic reduction of silicon dioxide to form silicon, said process comprising passing electrical energy into a reaction zone of a silicon furnace, feeding silicon dioxide and a solid reducing agent into the reaction zone, recovering molten silicon from the reaction zone, and handling by-produced gases from the reaction zone, the improvement comprising (A) operating a silicon furnace in a closed mode at a pressure at or above atmospheric pressure;

(B) simultaneously feeding and controlling the proportions of (i) the by-produced gases, including silicon-containing materials, from the silicon furnace and (ii) a cooling medium selected from a group consisting of (a) a vaporizing liquified hydrocarbon-containing gas and (b) a compressed hydrocarbon-containing gas which is allowed to expand to facilitate cooling, to a means for contacting (i) and (ii);

(C) contacting the by-produced gases from the silicon furnace with the cooling medium to cool the by-produced gases, and to cause the silicon-containing materials to completely condense and to form agglomerated, solid silicon-containing material; and (D) passing the resultant stream of gases and agglomerated, solid silicon-containing material from (C) through a means to remove the agglomerated, solid silicon-containing material.

The silicon furnace may be of any design known in the art, Examples of such furnace design are submerged electric arc furnaces and furnaces in which electrical energy is supplied by a transferred arc plasma. The silicon furnace, irrespective of the mode of energy input, must be operated in a sealed or "closed" mode. The use of a closed mode is necessary to eliminate the introduction of extraneous gases from the atmosphere that would dilute the chemical intermediate or energy value of the by-produced gases. The silicon furnace should be designed to operate at or above atmospheric pressure. Preferably, the furnace should be designed so that pressures in the range of atmospheric pressure to 6 atmospheres can be maintained. Operation of a closed furnace at atmospheric pressure or higher better facilitates the recovering of the by-produced gases after the gases exit the furnace.

"By-produced gases" means the gaseous by-products of the carbothermic reduction of silicon dioxide and other gases which leave the silicon furnace. These gases can include carbon monoxide, hydrogen, hydrocarbons, water, silicon monoxide, finely dispersed silicon and silicon dioxide, and others.

From the reactions described, supra, one of the intermediates in the reduction process is silicon monoxide (SiO). Based upon the stoichiometric amount of carbon monoxide generated in a silicon furnace, the gas could contain as much as 20 percent by weight silicon monoxide. At the temperatures of the reaction SiO is a gas. As the temperature of the by-produced gases leaving the silicon furnace cool to approximately 1500° C. or lower, the SiO is thought to disproportionate to a mixture of silicon and SiO$_2$. The disproportionation of SiO can be represented by the reaction $$2SiO = Si + SiO_2.$$

The silicon and SiO$_2$ so formed would be a finely dispersed solid in the by-produced gas stream. It is estimated that as much as 10 to 20 percent of the silicon in the SiO$_2$ fed in present silicon furnaces is lost as gaseous SiO or as silicon and SiO$_2$ from the disproportionation of SiO. SiO will also react with oxygen to form solid SiO$_2$. The presence of silicon monoxide in the by-produced gases from a silicon furnace is a severe hindrance to the ability to recover these gases and to subsequently use the gases as a feed to a process for producing useful chemical intermediates or as a fuel for a combustion process. The presence of SiO, silicon, or SiO$_2$ causes mechanical difficulties for chemical processing equipment or combustion equipment. As an example of these difficulties, the formation of solids would cause plugging problems with process piping and equipment. Further, the formation of silicon-containing solids cause erosive effects to moving equipment. Additionally, the formation of solids coats and fouls catalytic surfaces in the reaction to convert these by-produced gases into useful chemical intermediates. Further, solid silicon-containing materials would fuse to glass at the temperatures in a combustion chamber causing severe restriction to heat-transfer. Therefore, it is a necessity to remove silicon monoxide and other silicon-containing materials from the by-produced gases from a silicon furnace before the gases can be recovered and utilized.

Gaseous silicon monoxide and finely dispersed silicon and silicon dioxide are grouped together and defined as "silicon-containing materials."

For the purposes of the instant invention "hydrocarbon-containing gas" means natural gas, a pure hydrocarbon, or mixtures thereof. "Natural gas" means a mixture of naturally-occurring hydrocarbon-containing gases that result from petroleum crude oil well or gas well operations. The hydrocarbon-containing gas used in contacting the by-produced gases from the carbothermic reduction of silicon dioxide is selected from a group which consists of natural gas, methane, ethane, propane, butane, and mixtures thereof. Natural gas and propane are preferred hydrocarbon-containing gases. A hydrocarbon-containing gas is used in the instant invention so that the by-produced gases from a silicon furnace are not diluted with an inert gas which will be detrimental to conversion of the by-produced gases to a useful chemical compound or as a fuel for a combustion process.

For the purposes of the instant invention "liquified hydrocarbon-containing gas" means natural gas, a pure hydrocarbon, or mixtures thereof that have a vapor pressure such that while they will be liquid under pressure they will be a gas well below ambient temperatures at atmospheric pressure. In the instant invention cooling of the by-produced gases is effected by the known phenomena of (i) the cooling effect of a vaporizing liquid or (ii) the cooling effect of an expanding compressed gas via the Joule-Thompson effect.

Feeding the by-produced gases to a means for contacting a liquified hydrocarbon-containing gas or a compressed hydrocarbon-containing gas can be effected by means of the pressure within the silicon furnace. Feeding the by-produced gases may also be effected by conventional means such as a gas blower; such a blower would have to be of special design and materials of construction to withstand the high temperatures of the exiting by-produced gases. Feeding the liquified hydrocarbon-containing gas is effected by conventional means such as use of the pressure of the vapor space above the liquified gas in a storage tank as the motive force or the use of a pump which is suitable for pumping liquified gases. Feeding the compressed hydrocarbon-containing gas may be effected by known methods such as a compressor. Controlling the proportions of the by-produced gas stream and the cooling medium can be effected by such conventional means as manual control or automatic control. The proportions of by-produced gases relative to the cooling medium are controlled so the that the final temperature of the resultant gas and solid, agglomerated silicon-containing material stream is compatible with the materials of construction of downstream handling equipment—for ceramics and high-temperature metals the preferred temperature is less than 400° C.: for fabric-type filters the preferred temperature is less than 200° C. Thus, the final temperature of the cooled by-produced gases and solid, agglomerated silicon-containing materials could be at 200° C. or lower.

Contacting the by-produced gases with the cooling medium can be effected by means known in the art. Contacting the by-produced gases from a silicon furnace with a liquified hydrocarbon-containing gas to vaporize the liquified natural gas, to cool the by-produced gases, and to cause the finely dispersed silicon-containing materials to form an agglomerated solid can be effected by conventional means. An example of such conventional means is an expansion chamber in which the by-produced gases and the pressurized, liquified hydrocarbon-containing gas are brought into contact, the liquified hydrocarbon-containing gas vaporizing upon release of pressure, the resultant gas mixture being cooled, and the finely dispersed silicon-containing materials being converted to an agglomerated solid. Similarly, contacting the by-produced gases from the silicon furnace and a compressed hydrocarbon gas can be effected in a means for allowing the compressed gas to expand and to cool the resulting gas mixture of by-produced gases, hydrocarbon-containing gases, silicon-containing materials.

"A means for removing the agglomerated, solid silicon-containing material" means any suitable conventional gas-solid separation device. An example of a suitable class of gas-solid separation devices is filtration. Examples of conventional filters that can be used for the instant invention are fabric medium filters, porous solid medium filters, or the like. Fabric medium filters are known in the art of filtration. An example of fabric medium filters are bag filters used in conjunction with a conventional baghouse for separating solids from large-volume process gas streams. Porous solid medium filters are also well-known in the art. Examples of porous solid medium filters are sintered metal and sintered non-metal filter elements. Fabric medium filters are the preferred means to remove agglomerated, solid-silicon containing materials. A preferred means for removing the solid silicon-containing materials from the mixed gas stream of the by-produced gases from the silicon furnace and the hydrocarbon-containing gas is a baghouse which contains bags constructed of a fabric filter medium.

The proportions of the by-produced gases and the liquified hydrocarbon-containing gas or the compressed hydrocarbon-containing gas should be controlled so that the temperature of the resultant gas-solid mixture is less that 400° C.

The by-produced gases which are composed primarily of carbon monoxide, with the remainder being composed mainly of hydrogen and hydrocarbons, have value as a chemical intermediate or a combustible fuel. A representation of a possible composition of silicon furnace gas is as follows:

| | |
|---|---|
| CO | 42% |
| $H_2$ | 29% |
| $CH_4$ | 12% |
| Air | 2% |
| $CO_2$ | 1% |
| $H_2O$ | 14%. |

The by-produced gases have sufficient carbon and hydrogen content to be utilized as a chemical intermediate or as a combustible fuel. The above gas mixture has an energy or heating value of approximately 250 to 300 British Thermal Units (BTU)/standard cubic feet of gas. The by-produced gases have sufficient energy value alone as a fuel. The combination with a hydrocarbon-containing gas would greatly enrich the energy value of this combined gas mixture. The energy value of the by-produced gases from a silicon furnace combined with a hydrocarbon-containing gas could be utilized in such known applications as fuel for a boiler to produce process steam. Additionally, the gas mixture could be utilized as a fuel for a gas turbine which is coupled to an electric generator. The electricity so generated could supplement much of the electricity needed for operation of the silicon furnace. Steam boilers and gas turbines to run an electric generator can be any of those means known in the art of design and installation of such means. Preferred means for recovering the fuel value of the mixture of the by-product gases of a silicon furnace and the hydrocarbon-containing gas is either a steam boiler or a gas turbine coupled to an electric generator.

Carbon monoxide and hydrogen are the primary components of the by-produced gases. Carbon monoxide is known as a valuable raw material in the preparation of organic chemicals such as alcohols, ketones, aldehydes, amines, carboxylic acids, and the like. An example of a preferred use of carbon monoxide as a chemical intermediate is the preparation of methanol in which carbon monoxide and hydrogen are reacted in the presence of a solid catalyst. Such a reaction to prepare methanol from carbon monoxide is disclosed by Dienes et al., in U.S. Pat. No. 4,279,781, issued July 21, 1981, Dienes et al., disclose a solid catalyst for the reaction of carbon monoxide and hydrogen to produce methanol. The solid catalyst disclosed by Dienes et al., comprises a major portion by weight of oxides of copper and zinc and a minor portion by weight of a thermal stabilizing metal oxide such as aluminum oxide. The hydrocarbon-containing gas, mixed with the by-produced gases from a silicon furnace, can also be utilized as a chemical intermediate. An example of utilization of the hydrocarbon-containing gases would be the reaction of these gases with steam, via the known steam reforming technique to produce additional carbon monoxide.

So that those skilled in the art may better appreciate the features of the instant invention, the following example is presented. The example is presented to be illustrative of the instant invention and is not to be construed as limiting the instant invention delineated in the claims.

EXAMPLE

A gas mixture simulating the by-produced gases from a silicon furnace was evaluated as a chemical intermediate. The basis for the gas mixture evaluated was the representative composition of a silicon furnace gas presented, supra. A custom mixture of gas was prepared by Linde Corporation. The gas mixture was compressed and charged into a gas cylinder. The gas pressure in the cylinder was approximately 1800 pounds per square inch, gauge (psig). Table 1 is a comparison of the composition of the custom gas mixture (designated as "Custom Mixture") to the representative composition (designated "Theory"). Composition in volume percent is designated %.

TABLE 1

| Component | Custom Mixture | Theory |
|---|---|---|
| CO | 44.5% | 42% |
| $H_2$ | 30.5% | 29% |
| $CH_4$ | 14.5% | 12% |
| $O_2$ | 0.4% | 0.4% |
| $N_2$ | 1.4% | 1.6% |
| $CO_2$ | 1.2% | 1% |
| $H_2O$ | 0 | 14%. |

The custom gas mixture contained no water or silicon-containing material.

The custom mixture of gases was used as a chemical intermediate for the synthesis of methanol following the teachings of Dienes et al., U.S. Pat. No. 4,279,781, issued July 21, 1981. Dienes et al., disclose the preparation of methanol via the vapor phase reaction of oxides of carbon and hydrogen in the presence of a solid catalyst which comprises a mixture of oxides of copper and zinc and a thermal stabilizing metal oxide, such as aluminum oxide. The catalyst used, United Catalysts $C_{18}HC$, was purchased from United Catalysts. Inc., Louisville, Ky. was similar to catalysts disclosed in Dienes et al.

The reactor utilized was a closed stainless steel pipe, ½ inch in diameter and 12 inches long. The reactor was fitted with a conventional pressure control valve to maintain reaction pressure. The opposing end of the reactor was fitted for gas feed. The reactor was placed in an electrically heated tube furnace. The feed gas mixture was passed through a bed of Linde 13× molecular sieves to remove any water. The reactor was filled with approximately 15 grams of the C18HC catalyst. The outlet of the reactor was connected to a gas chromatographic analyzer to analyze the composition of the effluent gases from the reactor.

The reactor was heated to and maintained at a temperature of about 230° C. Reactor pressure was controlled at about 750 psig. The gas mixture was fed to the reactor at a flow rate of 75 milliliters per hour.

The mole ratio of hydrogen to carbon monoxide in the mixed feed gas was 0.68/1. Gas chromatographic analyses indicated that, assuming that carbon monoxide and hydrogen react according to the reaction, $$CO + 2H_2 = CH_3OH,$$

approximately 85 percent of the carbon monoxide that could react with the available hydrogen in the gas mixture did react. Gas chromatographic analyses further showed that the consumption of carbon monoxide could be accounted for by the generation of methanol.

The above results demonstrate that a gas which simulates the composition of the by-product gases from a silicon furnace can be utilized as a chemical intermediate for the production of a useful chemical such as methanol.

What is claimed is:

1. In a process for the carbothermic reduction of silicon dioxide to form silicon, said process comprising passing electrical energy into a reaction zone of a silicon furnace, feeding silicon dioxide and a solid reducing agent into the reaction recovering molten silicon from the reaction zone, and handling by-produced gases from the reaction zone, the improvement comprising
   (A) operating a silicon furnace in a closed mode at a pressure at or above atmospheric pressure;
   (B) simultaneously feeding and controlling the proportions of (i) the by-produced gases, including silicon-containing materials, from the silicon furnace and (ii) a cooling medium selected from a group consisting of (a) a vaporizing liquified hydrocarbon-containing gas and (b) a compressed hydrocarbon-containing gas which is allowed to expand to facilitate cooling, to a means for contacting (i) and (ii):
   (C) contacting the by-produced gases from the silicon furnace with the cooling medium to cool the by-produced gases, and to cause the silicon-containing materials to completely condense and to form agglomerated, solid silicon-containing material; and
   (D) passing the resultant stream of gases and agglomerated, solid silicon-containing material from (C) through a means for removing the agglomerated, solid silicon-containing material.

2. A process according to claim 1, wherein the cooling medium is a liquified hydrocarbon-containing gas and contacting of the by-produced gases from the silicon furnace with the liquified hydrocarbon-containing gas is effected by allowing the liquified hydrocarbon-containing gas to vaporize.

3. A process according to claim 1, wherein the cooling medium is a compressed hydrocarbon-containing gas and contacting of the by-produced gases from the silicon furnace with the compressed hydrocarbon-containing gas is effected by allowing the compressed hydrocarbon-containing gas to expand.

4. A process according to claim 1, wherein the cooling medium used in contacting the by-produced gases is selected from a group which consists of natural gas, methane, ethane, propane, butane, and mixtures thereof.

5. A process according to claim 4, wherein the cooling medium is propane.

6. A process according to claim 4, wherein the cooling medium is natural gas.

7. A process according to claim 2, wherein the liquified hydrocarbon-containing gas used in contacting the by-produced gases is selected from a group which consists of natural gas. methane, ethane, propane, butane, and mixtures thereof.

8. A process according to claim 7, wherein the liquified hydrocarbon-containing gas is propane.

9. A process according to claim 7, wherein the liquified hydrocarbon-containing gas is natural gas.

10. A process according to claim 3, wherein the compressed hydrocarbon-containing gas used in contacting the by-produced gases is selected from a group which consists of natural gas, methane, ethane, propane, butane, and mixtures thereof.

11. A process according to claim 10, wherein the compressed hydrocarbon-containing gas is propane.

12. A process according to claim 10, wherein the compressed hydrocarbon-containing gas is natural gas.

13. A process according to claim 1, wherein the proportions of the by-produced gases and the cooling medium fed to a means for contacting the by-produced gases and the cooling medium are controlled so that the resultant stream of gases and agglomerated, solid silicon-containing material has a final temperature of less than 400° C.

14. A process according to claim 2, wherein the proportions of the by-produced gases and the liquified hydrocarbon-containing gas fed to a means for contacting the by-produced gases and the liquified hydrocarbon-containing gas are controlled so that the resultant stream of gases and agglomerated, solid silicon-containing material has a final temperature of less than 400° C.

15. A process according to claim 3, wherein the proportions of the by-produced gases and the compressed hydrocarbon-containing gas fed to a means for contacting the by-produced gases and the compressed hydrocarbon-containing gas are controlled so that the resultant stream of gases and agglomerated, solid silicon-containing material has a final temperature of less than 400° C.

16. A process according to claim 1, wherein the improvement further comprises recovering energy value from the by-produced gases from (D).

17. A process according to claim 1, wherein the improvement further comprises utilizing the by-produced gases from (D) as a chemical intermediate.

18. A process according to claim 17, wherein utilizing the by-produced gases as a chemical intermediate comprises converting the by-produced gases to methanol.

19. A process according to claim 18, wherein converting the by-produced gases to methanol comprises reacting carbon monoxide contained in the by-produced gases with hydrogen in the presence of a solid catalyst which comprises a major portion by weight of oxides of copper and zinc and a minor portion by weight of a thermal stabilizing metal oxide in addition to the copper oxide and zinc oxide.

* * * * *